(12) United States Patent
Lin et al.

(10) Patent No.: US 7,841,904 B2
(45) Date of Patent: Nov. 30, 2010

(54) CABLE ASSEMBLY HAVING ENHANCED MECHANICAL INTERCONNECTION MEANS THEREOF

(75) Inventors: Yuan-Chieh Lin, Lake Forest, CA (US); Chong Yi, Mechanicsburg, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/386,405

(22) Filed: Apr. 16, 2009

(65) Prior Publication Data

US 2010/0124395 A1 May 20, 2010

(51) Int. Cl.
*H01R 24/00* (2006.01)
(52) U.S. Cl. ...................................... 439/660
(58) Field of Classification Search .............. 439/660, 439/452, 607.1, 497, 608, 610; 385/58, 78, 385/33, 89, 766
See application file for complete search history.

(56) References Cited

U.S. PATENT DOCUMENTS

| | | | |
|---|---|---|---|
| 4,449,784 A * | 5/1984 | Basov et al. ................ 385/75 |
| 5,037,175 A * | 8/1991 | Weber ........................ 385/76 |
| 5,732,175 A * | 3/1998 | Fan ............................ 385/87 |
| 6,196,864 B1 * | 3/2001 | Huguenet ................... 439/446 |
| 6,719,461 B2 * | 4/2004 | Cull ........................... 385/71 |
| 6,931,183 B2 * | 8/2005 | Panak et al. ................ 385/101 |
| 7,021,971 B2 | 4/2006 | Chou et al. |
| 7,048,449 B2 * | 5/2006 | Frojdh et al. ................ 385/88 |
| 7,104,848 B1 | 9/2006 | Chou et al. |
| 7,380,991 B2 | 6/2008 | Schempp |

* cited by examiner

*Primary Examiner*—Alexander Gilman
(74) *Attorney, Agent, or Firm*—Wei Te Chung; Andrew C. Cheng; Ming Chieh Chang

(57) ABSTRACT

A cable assembly (1) includes an insulative housing (11) having a base portion (110) and a tongue portion (112) extending forwardly from the base portion; a plurality of contacts (113) supported by the insulated housing; at least a lens (120) mounted to the insulated housing; a cable (2B) including a number of wires (21), at least an optic fiber (22) and a strength member (23) therein, the wires respectively connected to the contacts, the optical fiber coupled to the lens, and the strength member wrapped around at least a tab (1106) formed on the base portion; and an adhesive material (1108) applied to the tab to make the strength member securely attached to the tab.

20 Claims, 6 Drawing Sheets

CABLE ASSEMBLY HAVING ENHANCED MECHANICAL INTERCONNECTION MEANS THEREOF

CROSS-REFERENCE TO RELATED APPLICATIONS

This application is related to U.S. patent application Ser. No. 12/313,224, filed on Nov. 18, 2008 and entitled "CABLE ASSEMBLY HAVING ENHANCED INTERCONNECTION MEANS THEREOF", which has the common assignee as the present invention.

BACKGROUND OF THE INVENTION

1. Field of the Invention

The present invention relates to a cable assembly, more particularly to a cable assembly with enhanced mechanical interconnection means arranged between an electrical connector and a cable thereof to reinforce physical or mechanical connection therebetween.

2. Description of Related Art

Recently, personal computers (PC) are used of a variety of techniques for transmitting data between different devices. Universal Serial Bus (USB) is a standard to the PC architecture with a focus on computer telephony interface, consumer and productivity applications. The design of USB is standardized by the USB Implementers Forum (USB-IF), an industry standard body incorporating leading companies from the computer and electronic industries. USB can be interconnected to peripherals such as mouse devices, keyboards, PDAs, gamepads and joysticks, scanners, digital cameras, printers, external storage, networking components, etc. For many devices such as scanners and digital cameras, USB also has become the standard connection interface.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed. 3) Hi-Speed rate of up to 480 Mbit/s (60 MB/s). Though Hi-Speed devices are advertised as "up to 480 Mbit/s", not all USB 2.0 devices can run at such Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transfer rates of the non-USB protocols discussed above are highly desirable for certain applications. However, these non-USB protocols are not used as broadly as USB protocols. Many portable devices are equipped with USB connectors other than these non-USB connectors. One important reason is that these non-USB connectors contain a greater number of signal pins than an existing USB connector and are physically larger as well. For example, while the PCI Express is useful for its higher possible data rates, a 26-pin connectors and wider card-like form factor limit the use of Express Cards. For another example, SATA uses two connectors, one 7-pin connector for signals and another 15-pin connector for power. Due to its clumsiness, SATA is more useful for internal storage expansion than for external peripherals.

The existing USB connectors have a compact size but low transmission rate, while other non-USB connectors (PCI Express, SATA, et al) have a high transmission rate but bulky size. Neither of them is desirable to implement modern high-speed, miniaturized electronic devices and peripherals. To provide a kind of connector with a compact size and a high transmission rate for portability and high data transmitting efficiency is therefore much desirable from the market.

In recent years, more and more electronic devices are adopted for working as an optical transmitter. It may be good idea to design a connector which is capable of transmitting both an electrical signal and an optical signal. Someone has begun to conceive such kind of connector which is compatible of transmitting both the electrical and optical signals. The connector includes metallic contacts assembled to an insulated housing and several optical lenses bundled together and mounted to the housing too. A kind of hybrid cable includes wires and optical fibers are respectively attached to the metallic contacts and the optical lenses so as to facilitate electrical and optical signal transmission.

Nevertheless, the optical fibers are vulnerable for different damages, and a reliable and robust mechanical interconnection between the connector and the hybrid cables are therefore needed.

BRIEF SUMMARY OF THE INVENTION

Accordingly, an object of the present invention is to provide a cable assembly which has enhanced mechanical interconnection means between wires and a connector.

In order to achieve the above-mentioned object, a cable assembly in accordance with present invention comprises an insulative housing having a base portion and a tongue portion extending forwardly from the base portion; a plurality of contacts supported by the insulated housing; at least a lens mounted to the insulated housing; a cable including a number of wires, at least an optic fiber and a strength member therein, the wires respectively connected to the contacts, the optical fiber coupled to the lens, and the strength member wrapped around at least a tab formed on the base portion; and an adhesive material applied to the tab to make the strength member securely attached to the tab.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
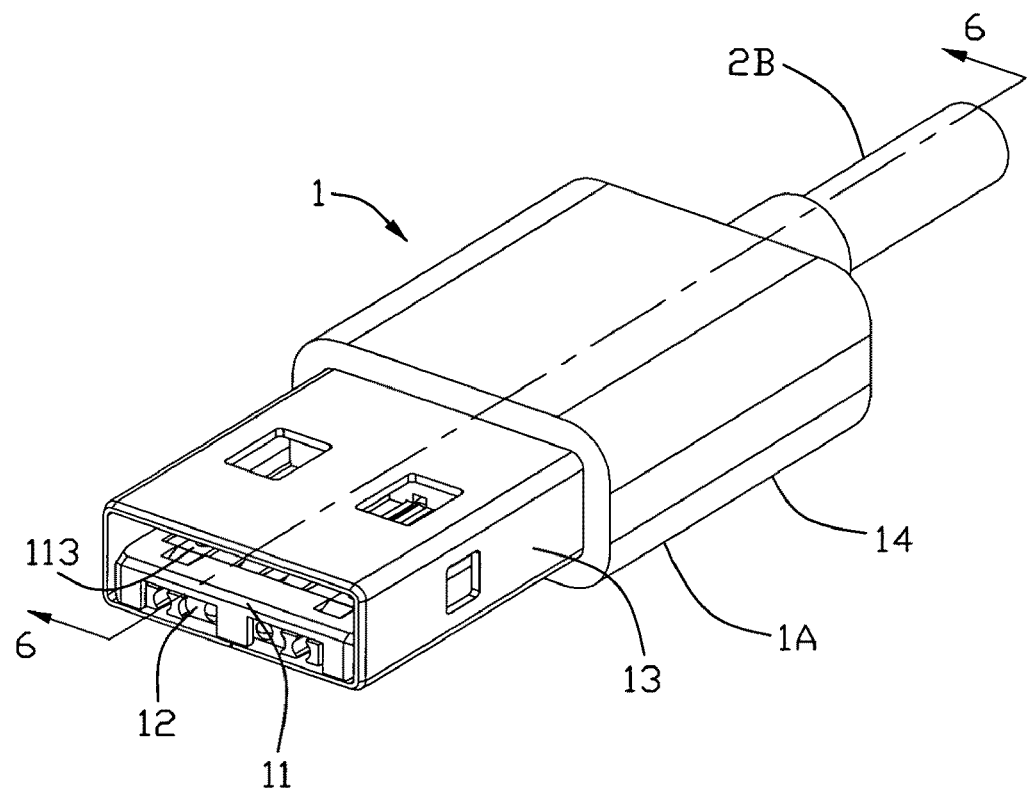
FIG. 1 is an assembled, perspective view of a cable assembly in accordance with the present invention.

In the following description, numerous specific details are set forth to provide a thorough understanding of the present invention. However, it will be obvious to those skilled in the art that the present invention may be practiced without such specific details.

Reference will be made to the drawing figures to describe the present invention in detail, wherein depicted elements are not necessarily shown to scale and wherein like or similar elements are designated by same or similar reference numeral through the several views and same or similar terminology.

Figure 2:
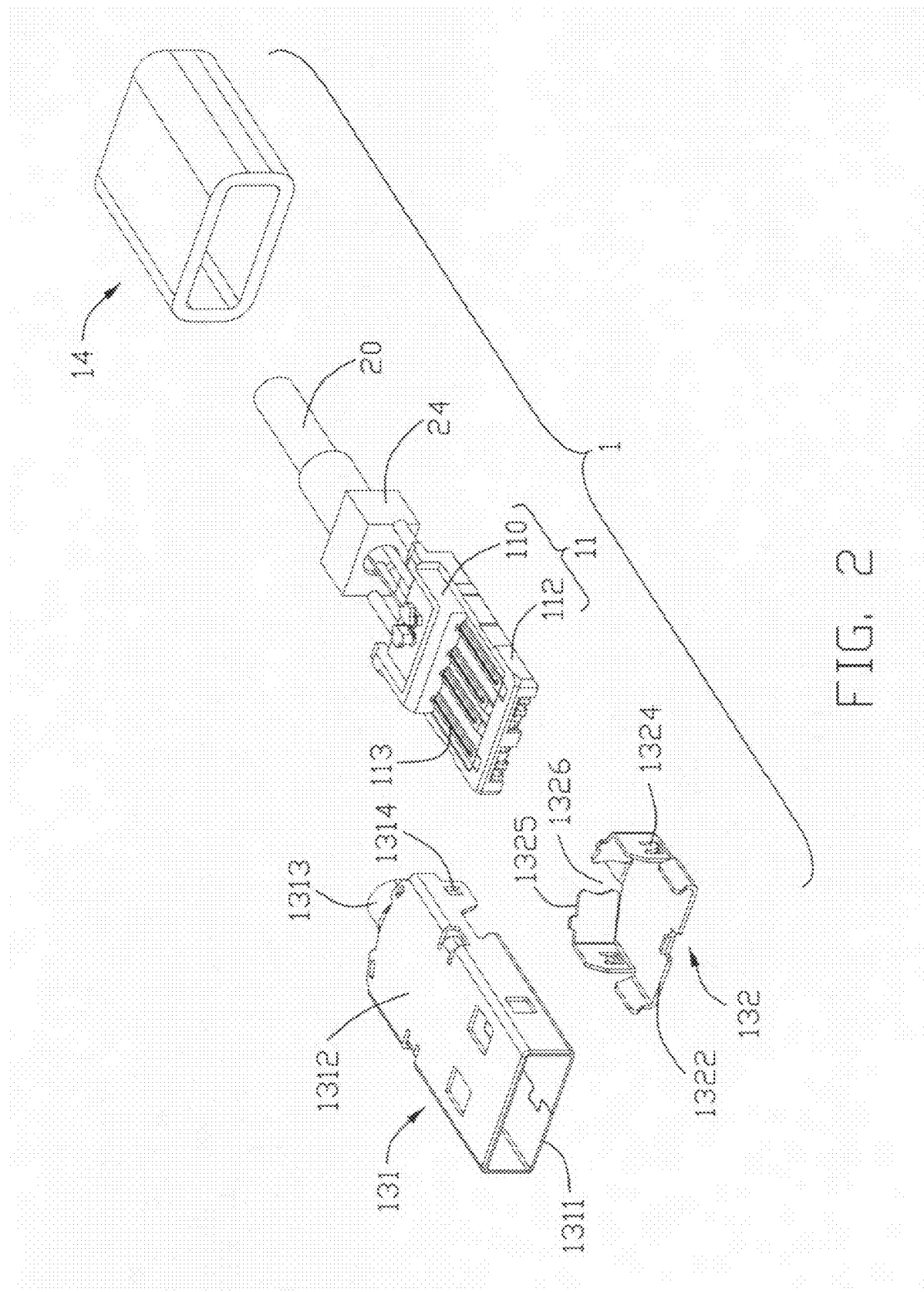
FIG. 2 is a partially assembled view of the cable assembly.
Figure 3:
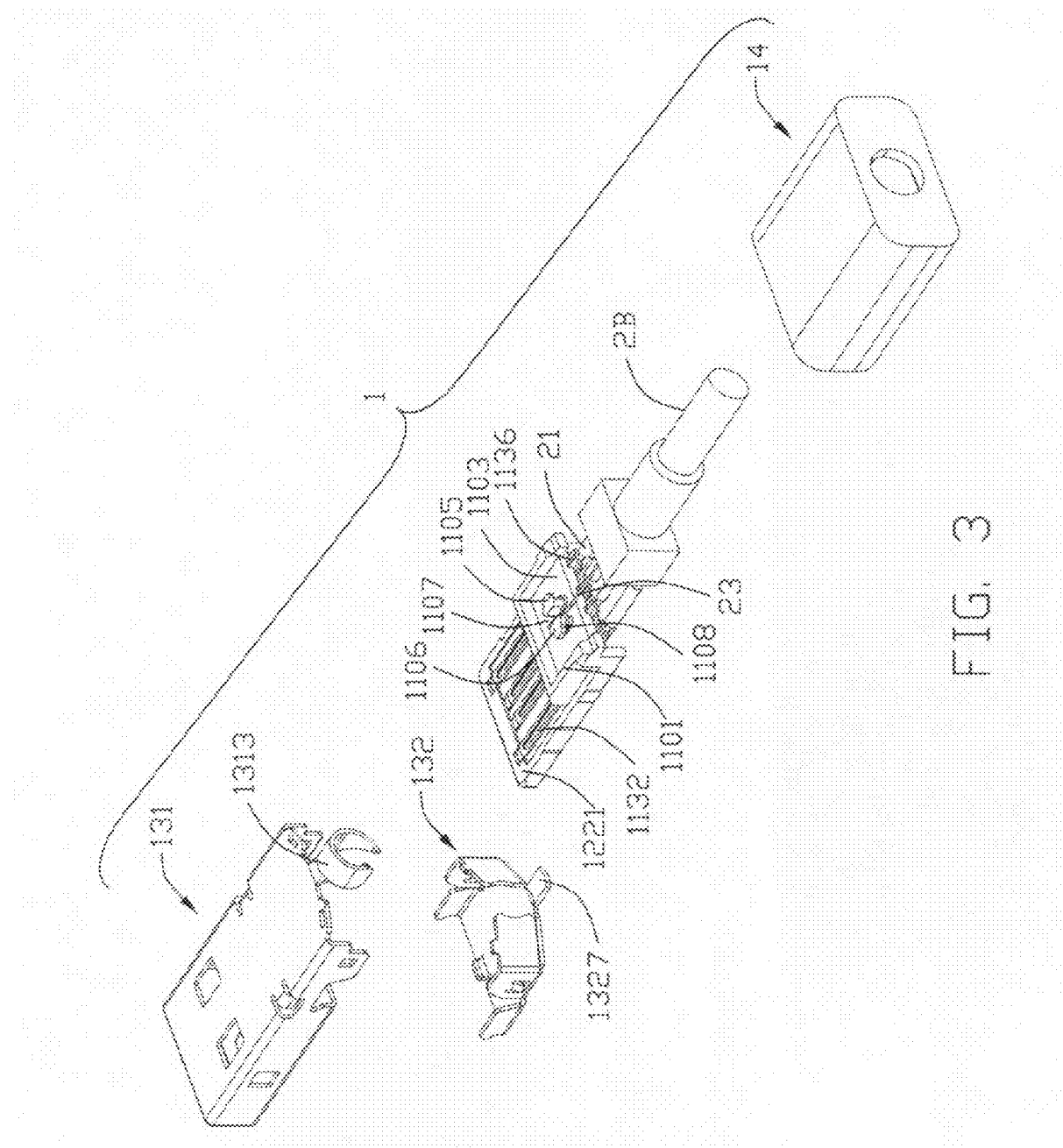
FIG. 3 is a view similar to FIG. 2, but viewed from other aspect.
Figure 4:
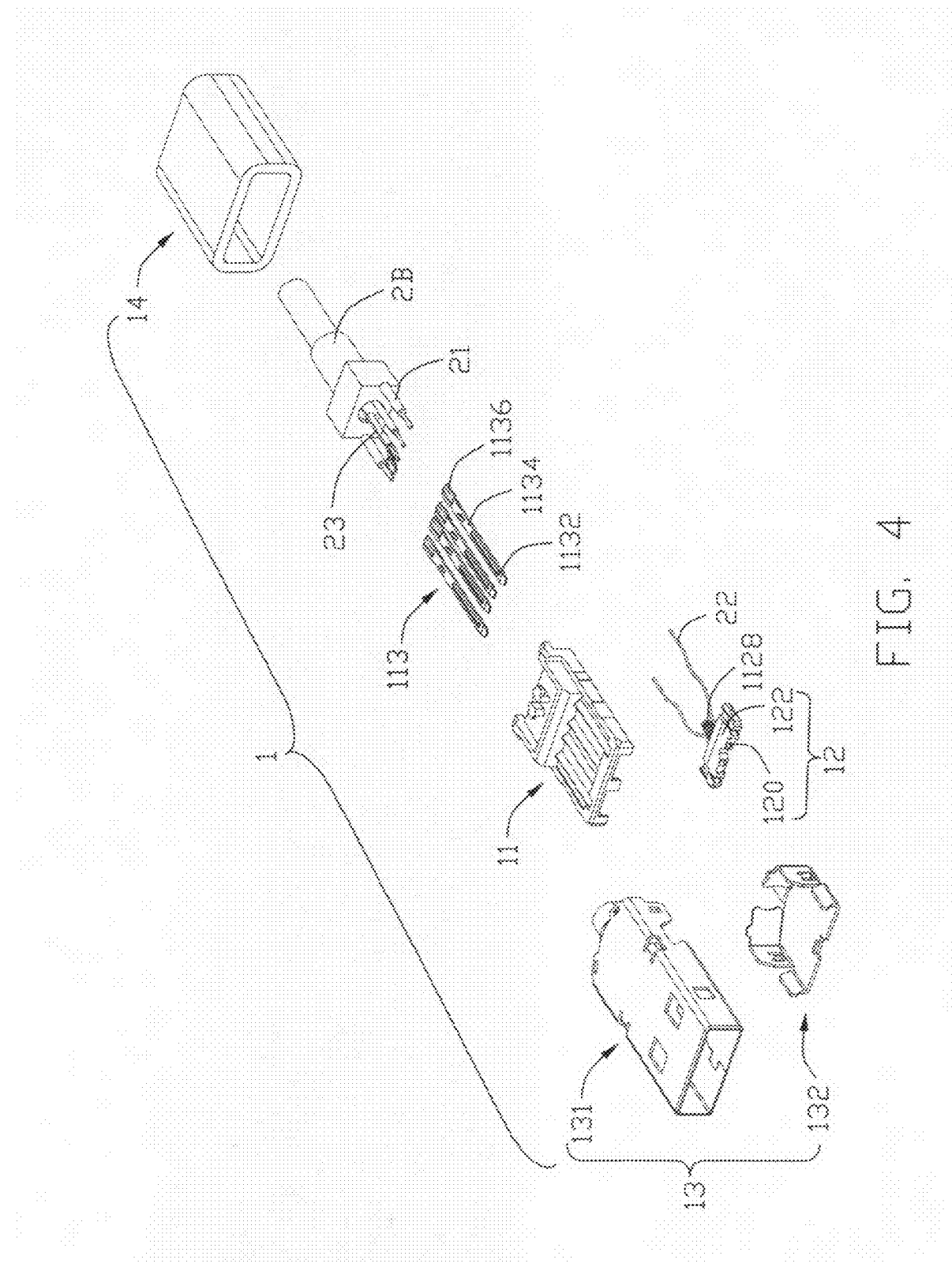
FIG. 4 is an exploded, perspective view of a cable assembly.
Figure 5:
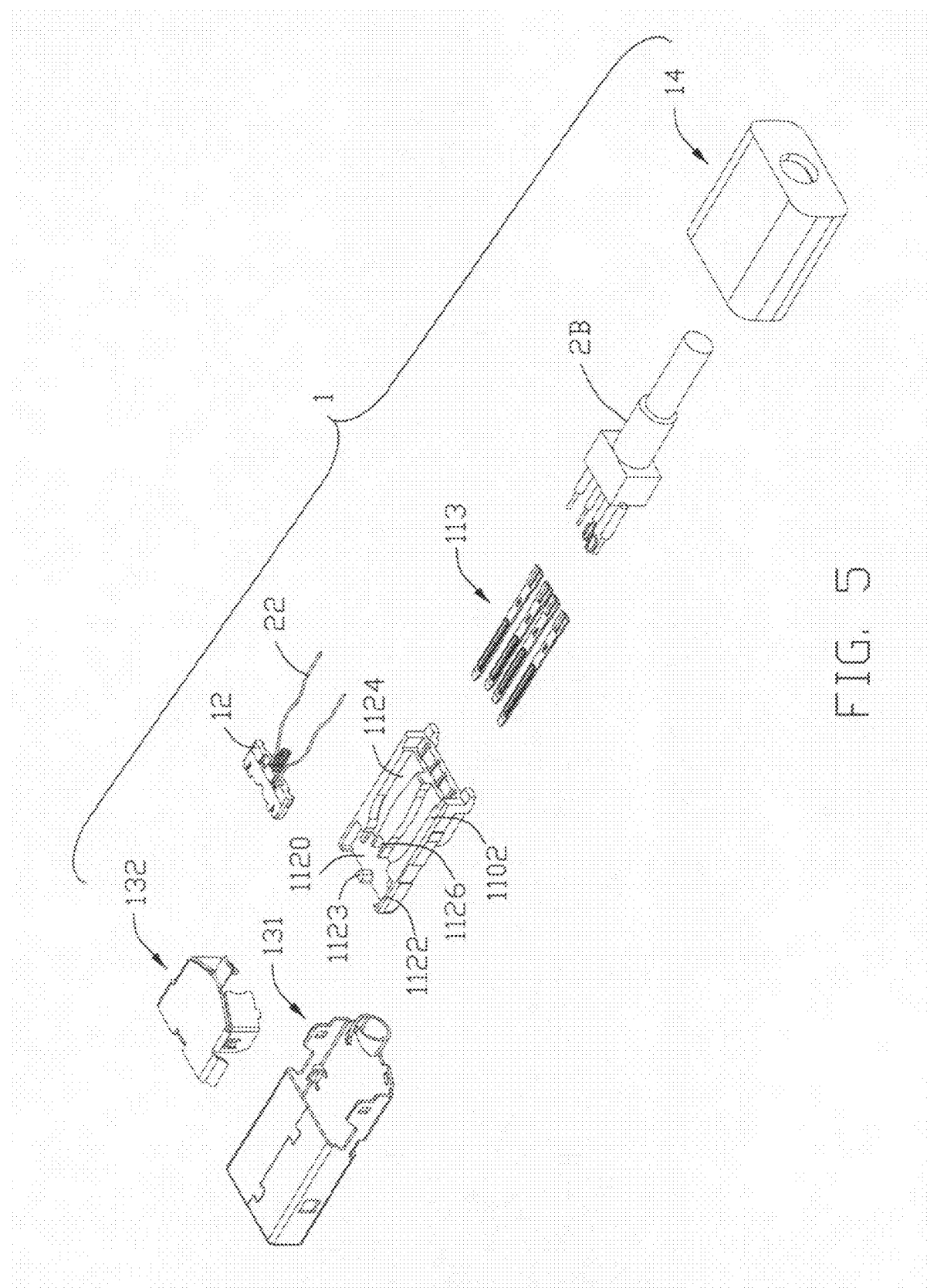
FIG. 5 is a view similar to FIG. 4, but viewed from a different aspect.
Figure 6:
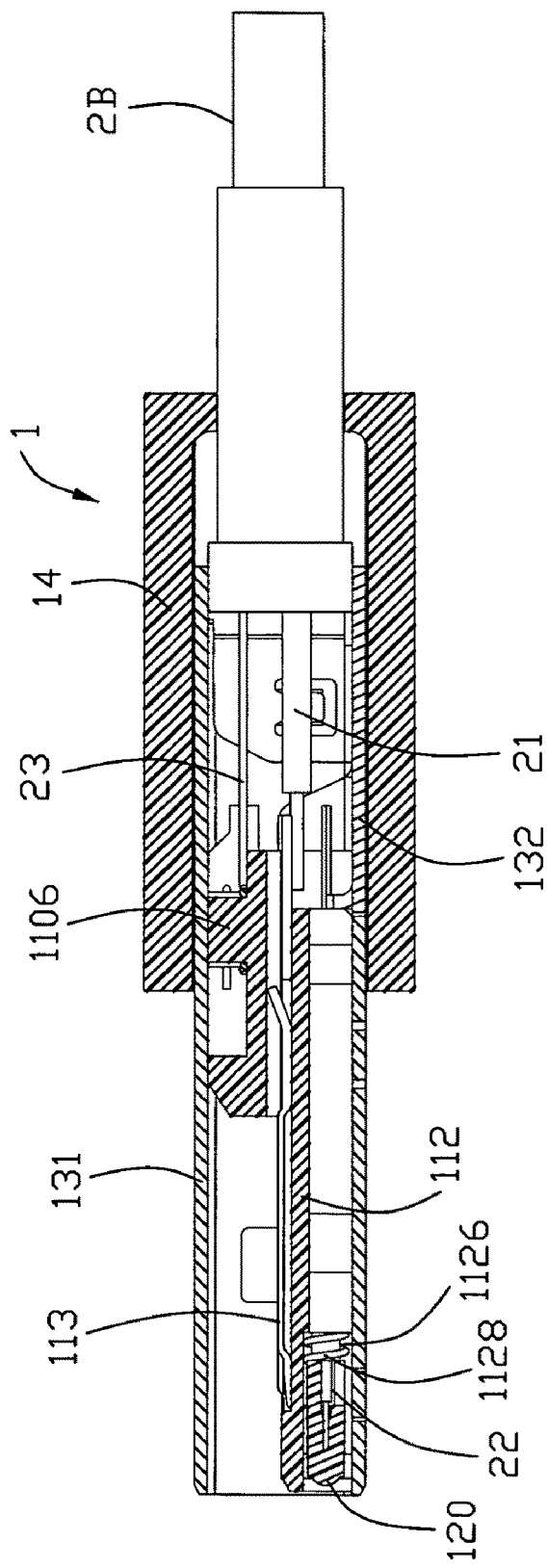
FIG. 6 is a cross-section view of FIG. 1 taken along line 6-6.

Referring to FIGS. 1-5, a cable assembly 1 according to a preferred embodiment of the present invention includes a connector 1A and a cable 2B connected to the connector 1A. Detail description of these elements and their relationship and other elements formed thereon will be detailed below.

The connector 1A comprises an insulative housing 11 which has an insulative base portion 110 and an insulative tongue portion 112 extending forwardly from a lower portion of a front edge of the insulative base portion 110, a set of contacts 113 supported by the insulative housing 11, an optical module 12 accommodated in a cavity 1120 defined in a lower section of the tongue portion 112.

The base portion 110 has a top surface 1101 which is higher than a top surface 1121 of the tongue portion 112; the base portion 110 further has a bottom surface 1102 is arranged at the same level as a bottom surface 1122 of the tongue portion 112. A rectangular shaped depression area 1103 is recessed downwardly from the top surface 1101 of the base portion 110. A first tab 1105 and a second tab 1106 are formed on a bottom surface of the depression area 1103. The first tab 1105 and the second tab are spaced apart from each other and disposed in a middle section of the depression area 1103. The cavity 1120 is upwardly recessed from a front section of the bottom surface 1122 of the tongue portion 112, with a block member 1123 located in front of the cavity 1120. Two passages 1124 are recessed downwardly from a back section of the bottom surface 1122 of the tongue portion 11 and the bottom surface 1102 of the base portion 110 and further communicate with the cavity 1120. A slot 1126 is defined in the lower section of the tongue portion 112, and arranged between front segments of the two passages 1124 and in communication with the cavity 1120.

Each of the contacts 113 includes a planar mating portion 1132 located on and supported by a front section of the top surface 1121 of the tongue portion 112, a tail portion 1136 extending beyond a back surface of the base portion 110, and a retention portion 1134 received in the base portion 110 and connecting the mating portion 1132 and the tail portion 1136.

The optical module 12 includes a holder member 122, two lenses 120 enclosed within the holder member 122. The optical module 12 is accommodated in the cavity 1120. A coil spring member 1128 is accommodated in the slot 1126 and presses onto the holder member 122.

The cable 2B comprises a number of wires 21 for transmitting electrical signals and optical fibers 22 for transmitting optical signals, and an insulative jacket 20 enclosing peripheral of the signal wires 21 and the optical fibers 22. The cable 2B further comprises a strength member 23 associated with the optical fibers 22 for increasing durability of the cable 2B or a tolerance the optical fibers 22. The strength member 23 may be Kevlar members, fiberglass, etc. The wires 21 are respectively connected to the tail portions 1136 of the contacts 113, and the optical fibers 22 are coupled to the lenses 120. A front segment of the strength member 23 is firstly wrapped around the first tab 1105, and then wrapped around the second tab 1106. An adhesive 1108, such as glue, cement, etc. is applied to the first tab 1105 and the second tab 1106 to have the strength member 23 attached to the first tab 1105 and the second tab 1106. The strength member 23 rearward extends beyond the first and second tabs 1105, 1106 via a corresponding gap 1107 therebetween. A strain relief member 24 is formed on a front segment of the insulative jacket 20 of the cable 2B.

The connector 1A further comprises a metal shell 13. The metal shell 13 includes a first part 131 and a second part 132 engaging with the first half part 131. The first part 131 comprises a front tube-shaped mating frame 1311, an inverted rear U-shaped body section 1312 connected to a top side and lateral sides of the mating frame 1311, and a cable holding member 1313 attached to a top side of the body section 1312. The second part 132 comprises a U-shaped body section 1322 and two locking members 1324 formed on lateral walls of the body portion 1322 to lock into corresponding locking holes 1314 which are defined in lateral walls of the body section 1312.

When assembly, partial of the insulative jacket 20 of a front segment of the cable 2B is stripped to have the wires 21, optical fibers 22 and the strength members 23 exposed. The wires 21 are soldered to the contacts 113, the optical fibers 22 are coupled to the lenses 120. The optical module 12 is disposed in the cavity 1120 of the tongue portion 112, and the optical fibers 22 received in the passages 1124 of the insulative housing 11. Secondly, the insulative housing 11 is inserted into the mating frame 1311, with the strain relief member 24 supported by the body section 1312. Thirdly, the strength member 23 is tautened and wrapped around the first tab 1105 and the second tab 1106, and the adhesive material 1108 is applied to thereto to make the strength member 23 securely attached to/fasten to the first and second tabs 1105, 1106. The second part 132 is assembled to the body section 1312 of the first part 131, with the strain relief member 24 sandwiched between the body section 1312 of the first part 131 and the body portion 1322 of the second part 132, the cable 2B extending outward of the metal shell 13 via a slot 1326 defined in a back wall 1325 of the second part 132, and supported by a tail part 1327 which is connected to a bottom wall of the second part 132 and protrudes backward along an extending direction of the slot 1326. The cable holding member 1313 is crimped to the cable 2B and the tail part 1327. An outer cover 14 is then attached to the first part 131 and the second part 132 of the metal shell 13.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

We claim:

1. A cable assembly, comprising:
   an insulative housing having a base portion and a tongue portion extending forwardly from the base portion; wherein the tongue portion defines a top surface and a bottom surface opposite to the top surface;
   a plurality of contacts supported by the insulated housing; wherein each contact has a mating portion arranged proximate to the top surface of the tongue portion, a tail portion extends beyond a back surface of the base portion;
   at least a lens received in the insulated housing;
   a cable including a number of wires, at least an optic fiber and a strength member therein, the wires respectively connected to the contacts, the optical fiber coupled to the lens, and the strength member wrapped around at least a tab formed on the base portion; and
   an adhesive material applied to the tab to make the strength member securely attached to the tab.

2. The cable assembly as claimed in claim 1, wherein there are two of the at least a tab spaced apart from each other, the strength member is wrapped the two tabs simultaneously.

3. The cable assembly as claimed in claim 1, wherein a depression area is defined in an upper section of the base portion to accommodate the tab therein.

4. The cable assembly as claimed in claim 1, wherein a cavity is recessed upwardly from the bottom surface of the tongue portion to accommodate the lens.

5. The cable assembly as claimed in claim 4, wherein the number of the at least a lens is two, said two lenses are enclosed in a holder member, and the holder member is received in the cavity.

6. The cable assembly as claimed in claim 5, wherein two passages are defined in a lower section of the insulative housing and communicate with the cavity, two optical fibers are received in the two passages and connected to the two lenses.

7. The cable assembly as claimed in claim 6, wherein a slot is defined in the lower section of the tongue portion and located behind the cavity.

8. The cable assembly as claimed in claim 7, further comprising a spring member accommodated in the slot and pressing against the holder member.

9. The cable assembly as claimed in claim 1, further comprising a metal shell enclosing the insulative housing therein.

10. The cable assembly as claimed in claim 9, wherein the metal shell includes a first part and a second part engaging each other to shield the insulative housing.

11. The cable assembly as claimed in claim 10, wherein a strain relief member is formed on a front portion of the cable and sandwiched between the first and second parts of the metal shell.

12. The cable assembly as claimed in claim 11, wherein an external cover is attached to the metal shell.

13. The cable assembly as claimed in claim 1, wherein the strength member is Kevlar member.

14. The cable assembly as claimed in claim 1, wherein the adhesive material is glue.

15. A cable connector assembly comprising:
    an insulative housing defining first and second levels different from each other;
    a plurality of conductive contacts disposed at the first level and extending along a front-to-back direction;
    a plurality of electrical wires connected to the corresponding contacts, respectively;
    an optical module disposed at the second level and moveable along said front-to-back direction regard to the housing;
    a plurality of lens disposed in the optical module; and
    a plurality of optical fibers intimately located behind the corresponding lens, respectively;
    wherein said wires are further equipped with a strength member which has a front segment grasping the housing and exposed outside of the housing.

16. The cable connector assembly as claimed in claim 15, further including a resilient member against the optical module to urge the optical module forwardly.

17. The cable connector assembly as claimed in claim 15, wherein said resilient member is located between the optical module and the housing.

18. The cable connector assembly as claimed in claim 15, wherein there is at least one tab formed on an outside of the housing and projecting upwardly, and the front segment of the strength member is attached to the at least one tab.

19. The cable connector assembly as claimed in claim 18, wherein the front segment of the strength member is wrapped around the at least one tab, and glue is applied to the front segment of the strength member and the at least one tab.

20. A cable connector assembly comprising:
    an insulative housing defining first and second levels different from each other;
    a plurality of conductive contacts disposed at the first level and extending along a front-to-back direction;
    a plurality of electrical wires connected to the corresponding contacts, respectively;
    an optical module disposed at the second level and moveable along said front-to-back direction regard to the housing;
    a plurality of lens disposed in the optical module; and
    a plurality of optical fibers intimately located behind the corresponding lens, respectively;
    wherein said wires are further equipped with a ropelike strength member extending forwardly beyond said wires and fastened to the housing.

* * * * *